April 15, 1952   J. J. FENDROCK   2,593,018
ANTISKID CHAIN COUPLING
Filed Aug. 12, 1949
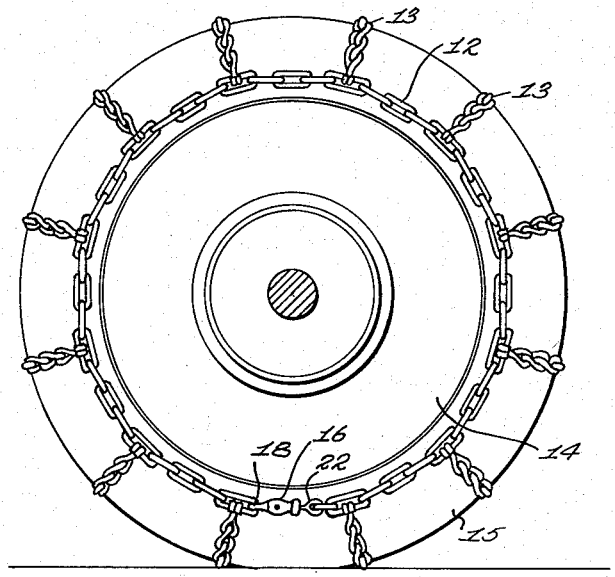
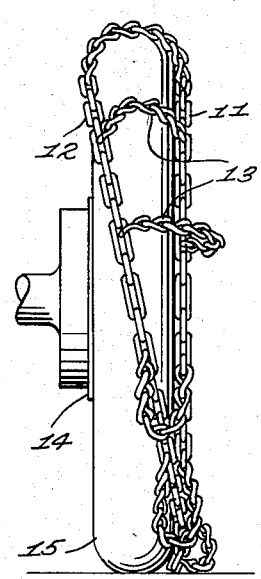
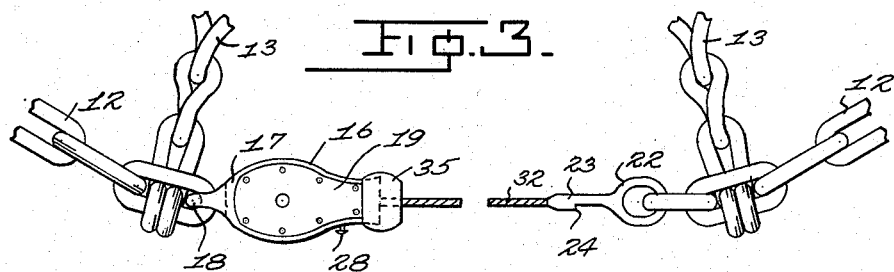
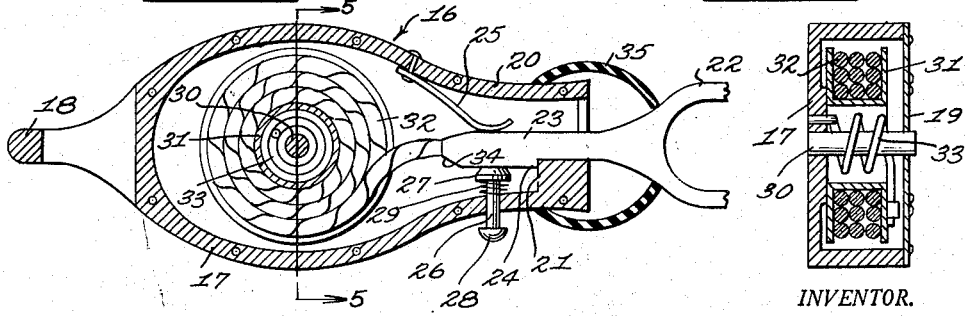
INVENTOR.
JOHN J. FENDROCK
BY
McMorrow, Berman & Davidson
ATTORNEYS Patented Apr. 15, 1952

2,593,018

UNITED STATES PATENT OFFICE 2,593,018

ANTISKID CHAIN COUPLING

John J. Fendrock, Simpson, Pa.

Application August 12, 1949, Serial No. 109,921

2 Claims. (Cl. 24—115)

This invention relates to anti-skid chains for pneumatic tires, and more particularly to an anti-skid tire chain of the self-tensioning type.

A main object of the invention is to provide a novel and improved anti-skid chain for pneumatic tires, said chain being simple in construction, being substantially continuous, being easy to mount on a tire, and eliminating the necessity of hooking and unhooking catch devices on inside portions of the chain, whereby the exertion and labor involved in mounting and demounting the chain is substantially reduced.

A further object of the invention is to provide an improved tire chain wherein the chain elements are substantially continuous, wherein the tire chain may be mounted on a wheel without the necessity of jacking up the vehicle, wherein the procedure of mounting or demounting the chain on or from a wheel is greatly simplified, and wherein only a few parts are employed, said parts being easily accessible and safe to manipulate.

Further objects and advantages of the invention will become apparent from the following description and claims, and from the accompanying drawings, wherein:

Figure 1 is an elevational view, taken from the inside of a wheel on which is mounted an improved anti-skid chain construction in accordance with the present invention;

Figure 2 is an end elevational view of the wheel of Figure 1, showing the anti-skid chain in partly-mounted position;

Figure 3 is an enlarged fragmentary detail elevational view of a portion of the chain illustrated in Figures 1 and 2, showing the tensioning device forming part of the chain;

Figure 4 is a longitudinal cross-sectional view taken through the tensioning device shown in Figure 3, said view being substantially enlarged in scale;

Figure 5 is a cross-sectional view taken on line 5—5 of Figure 4.

Referring to the drawings, the anti-skid device comprises an outer continuous chain section 11 and an inner chain section 12 connected by the evenly-spaced cross-chain-sections 13. The outer continuous chain section 11 is dimensioned to fit adjacent the outer rim portion of a wheel, such as the automobile wheel 14. The wheel 14 has a pneumatic tire 15 mounted thereon in the usual manner.

The inner chain section 12 includes an expansion element or coupling, designated at 16. As shown in Figures 4 and 5, expansion element 16 comprises a housing body 17 formed at one end with an eye 18 connected to one end link of the chain section 12. The body 17 is provided with a cover plate 19. As shown in Figure 4, the body 17 is relatively wide at its intermediate portion and is formed with a tapering outlet portion 20, the bottom wall of which is formed with an upstanding shoulder 21. Designated at 22 is an eye member connected to the other end link of the inner chain section 12. Eye member 22 is formed with a shank portion or rod 23 which extends into the outlet portion 20 of body 17, as shown in Figure 4, said shank portion 23 being formed with a bottom shoulder or abutment 24 lockingly engageable with the shoulder 21 to prevent outward movement of the shank portion 23. Secured to the top wall of body 17 is a leaf spring 25 which bears on shank portion or rod 23 and urges said shank portion against the shoulder 21. Slidably mounted in the bottom wall of body 17 opposite spring 25 is a release pin 26 having an inner head portion 27 and an outer button portion 28. A light coil spring 29 encircles pin 26 and bears between head portion 27 and the bottom wall of body 17. The force of spring 29 is insufficient to overcome the force exerted by spring 25 on shank portion 23. Therefore, shoulder 24 remains in interlocking engagement with shoulder 21 until button 28 is manually pushed upwardly.

Designated at 30 is a transverse shaft secured axially in the enlarged intermediate portion of body 17. Rotatably mounted on shaft 30 is a reel 31 on which is wound a flexible cable 32 secured to the end of shank portion 23. Reel 31 is biased clockwise, as viewed in Figure 4, by a coiled spring 33 encircling the shaft 30 and having one end thereof secured to body 17 and the other end thereof secured to reel 31. Spring 33, therefore, normally tends to wind up cable 32 on reel 31 and urges shank portion 23 inwardly of the outlet portion 20. The lower end portion of the shank 23 is beveled, as shown at 34, to facilitate the entry of the shank into the outlet portion.

A rubber shield 35 is secured to the outlet portion 20 around the shank portion 23 to prevent the entry of dirt into said outlet portion.

In mounting the anti-skid device on a wheel, the device is looped over the tire 15 with the continuous chain section 11 on the outside, as shown in Figure 2, and with the tensioning device 16 at the bottom of the anti-skid device. The chain is stretched as firmly as possible, and the car is moved forwardly until the tire is resting firmly on a portion of the chain. The expansion device 16 is then unlocked and the remainder of the anti-skid device is stretched over the tire. The car is then moved forwardly a short distance, allowing the tensioning device 16 to pull the inner chain section 12 into position adjacent the wheel rim, as shown in Figure 1. As the inner chain section is pulled into this position the spring 33 moves the shank portion 23 into the outlet portion 20 of the body 17, causing the shoulder 24 to snap into locking position with respect to shoulder 21, and thereby locking the anti-skid device on the wheel without requiring any further manipulation. Since the locking shoulder 24 of shank 23 is located outwardly with respect to the axis of the wheel 14, shoulder 24 is held in locking position not only by the force of spring 25, but by the centrifugal force acting on shank 23 produced by the rotation of wheel 14.

The anti-skid device is removed from the wheel by pushing in the manual release pin 26 and thereby unlocking shank 23. This allows the shank to be pulled out of the outlet portion 20 and allows the inner chain section 12 to be expanded, enabling it to be pulled outwardly over the circumference of the tire.

While a specific embodiment of a self-tensioning anti-skid chain device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An expansion coupling for securing together the ends of the inner chain of an anti-skid chain comprising an elongated housing having one end secured to one end of said inner chain and having the other end open, an internal shoulder on said housing adjacent said open end thereof, a reel mounted within said housing for rotation about an axis transverse of said housing, a cable having one end secured to and wound around said reel, spring means operatively connected to said reel for loading said reel for winding and unwinding said cable therearound, a rod having one end extending into the open end of said housing and secured to the other end of said cable, means on the other end of said rod for securing said other end to the other end of said inner chain, an abutment on said rod intermediate its ends and engageable with said shoulder when said one end of said rod extends into the open end of said housing for locking said reel in its wound position, a leaf spring positioned within said housing adjacent the other end thereof and having one end secured to said housing and having the other end engageable with said rod for urging the abutment against said shoulder, and hand actuable means exteriorly of said housing and engageable with said abutment for releasing said abutment from locking engagement with said shoulder to thereby allow unwinding of said cable against the action of said spring means.

2. An expansion coupling for securing together the ends of the inner chain of an anti-skid chain comprising an elongated housing having one end secured to one end of said inner chain and having the other end open, an internal shoulder on said housing adjacent said open end thereof, a reel mounted within said housing for rotation about an axis transverse of said housing, a cable having one end secured to and wound around said reel, spring means operatively connected to said reel for loading said reel for winding and unwinding said cable therearound, a rod having one end extending into the open end of said housing and secured to the other end of said cable, means on the other end of said rod for securing said other end to the other end of said inner chain, an abutment on said rod intermediate its ends and engageable with said shoulder when said one end of said rod extends into the open end of said housing for locking said reel in its wound position, a dirt shield positioned in covering relation with respect to the open end of said housing surrounding said rod and secured to said housing, a leaf spring positioned within said housing adjacent the other end thereof and having one end secured to said housing and having the other end engageable with said rod for urging the abutment against said shoulder, and a manually operable spring biased pin extending slidably through said housing and engageable with said abutment for releasing said abutment from locking engagement with said shoulder to thereby allow unwinding of said cable against the action of said spring means.

JOHN J. FENDROCK.

REFERENCES CITED

The following references are of record in the file of this patent:

UNITED STATES PATENTS

| Number | Name | Date |
|---|---|---|
| 318,369 | Gottstein | May 19, 1885 |
| 547,060 | Bourke | Oct. 1, 1895 |
| 581,309 | Savell | Apr. 27, 1897 |
| 768,658 | Dongille | Aug. 30, 1904 |
| 1,248,212 | Walden | Nov. 27, 1917 |
| 1,413,846 | Fredak | Apr. 25, 1922 |
| 1,475,065 | Gilbertson | Nov. 20, 1923 |
| 1,627,555 | Gause | May 10, 1927 |
| 2,346,477 | Ederer | Apr. 11, 1944 |
| 2,500,373 | O'Connor | Mar. 14, 1950 |

FOREIGN PATENTS

| Number | Country | Date |
|---|---|---|
| 535,027 | Germany | Oct. 5, 1931 |